April 6, 1954
H. W. CLAY
2,674,375
REVERSIBLE FLOUR SIFTER HAVING A DISCHARGE VALVE
Filed July 23, 1951
2 Sheets-Sheet 1
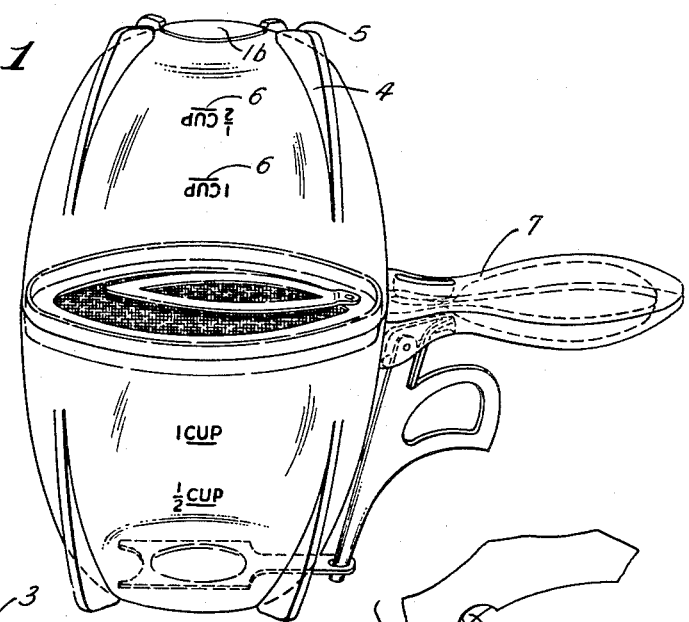
Fig.1
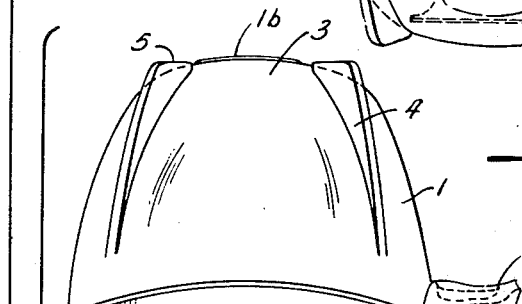
Fig.2
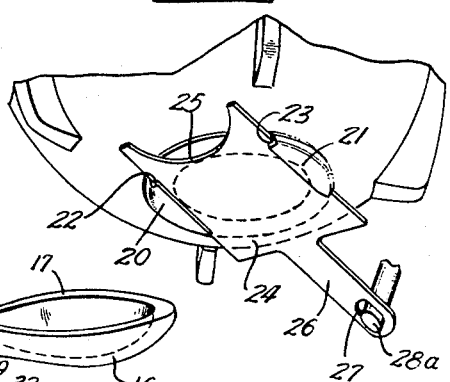
Fig.8
Fig.3
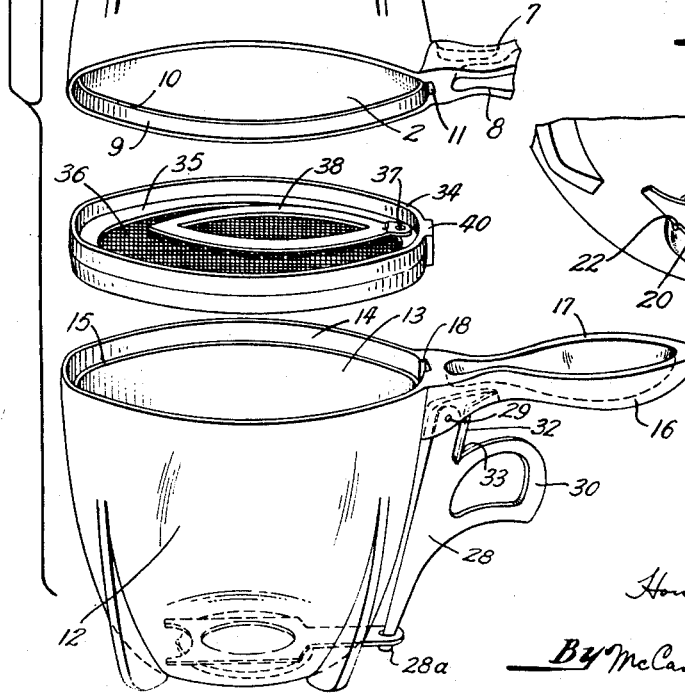
Inventor
Howard W. Clay
By McCanna and Morsbach
Attys.

April 6, 1954     H. W. CLAY     2,674,375
REVERSIBLE FLOUR SIFTER HAVING A DISCHARGE VALVE
Filed July 23, 1951     2 Sheets-Sheet 2

Inventor
Howard W. Clay
By McCanna and Morsbach,
Attys.

Patented Apr. 6, 1954

2,674,375

UNITED STATES PATENT OFFICE 2,674,375

REVERSIBLE FLOUR SIFTER HAVING A DISCHARGE VALVE

Howard W. Clay, Rockford, Ill., assignor to Rockford Inventors, Inc., Rockford, Ill., a corporation of Illinois Application July 23, 1951, Serial No. 238,159

4 Claims. (Cl. 209—251)

1

This invention relates to a sifter for flour or the like.

An object of this invention is to provide a sifter in which flour can be sifted a number of times before being emptied from the sifter and which reduces to a minimum the likelihood of spilling the flour.

Another object of this invention is to provide a flour sifter which permits the user to view the contents of the sifter and to measure the flour after sifting without removing the same from the sifter.

Another object of this invention is to provide a flour sifter which readily permits the addition of other dry ingredients, such as baking soda, to the flour after the flour has been partially sifted without removing the flour from the sifter, so that the other dry ingredients may be sifted with the flour in the final sifting operations.

Another object of this invention is to provide a flour sifter which readily permits the emptying of the desired portion of sifted flour from the sifter at successive times, so as to permit step-by-step mixing of the sifted flour with other ingredients in the mixing bowl.

Another object of this invention is to provide a flour sifter which readily comes apart for easy cleaning.

Still another object of this invention is to provide an improved flour sifter having a novel agitator arrangement and which may be readily manipulated with one hand in an easy fashion without straining the operator.

Yet another object of this invention is to provide a novel flour sifter having separate container portions on opposite sides of a mesh screen, wherein the container portions are formed with handle segments which abut to form a unitary handle when the sifter is assembled.

Other and further objects and advantages of the invention will be apparent from the following description of a preferred form thereof.

In the drawings:

Figure 1 is a front view of the assembled sifter of the present invention;

Figure 2 is an exploded perspective view of the sifter of Figure 1;

Figure 3 is a fragmentary perspective view of the discharge end of the sifter;

Figure 8 is a fragmentary perspective view of the end of the other container, showing the means for positively locating the end cap thereat.

Figure 4:
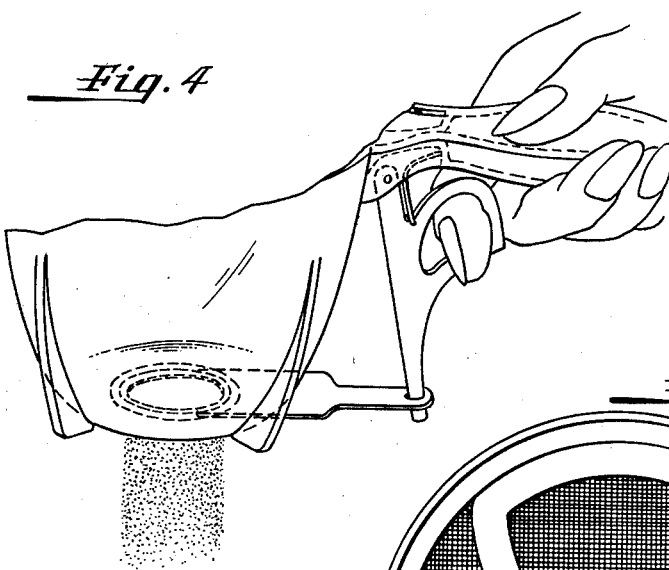
Figure 4 is a fragmentary perspective view illustrating the emptying of sifted flour through the discharge opening in the sifter.
Figure 5:
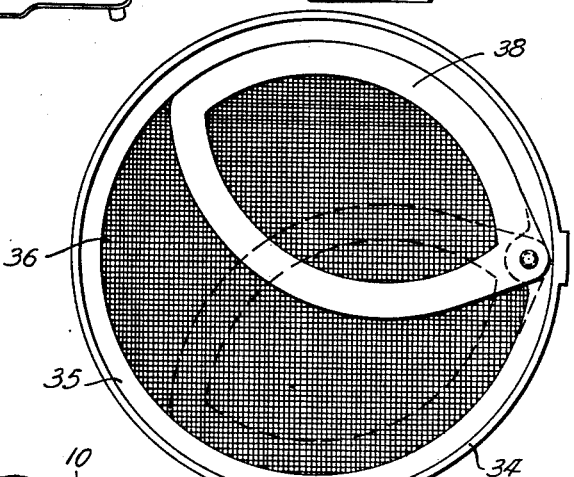
Figure 5 is a top view of the mesh screen and the agitator associated therewith in the sifter of the present invention.

As shown in the drawings, the sifter includes a first cup-shaped container 1 of suitable transparent or translucent plastic formed with a relatively wide circular open mouth 2 and a continuous body portion which tapers inward toward the narrower end 3 remote from the mouth. A plurality of longitudinal ribs 4 extend toward the narrow end of the container and provide a plurality of widely spaced substantially flat faces 5 thereat for seating the container in a stable manner on a flat surface, such as a table top. Graduations 6 and suitable indicia adjacent thereto are formed on the container to indicate the volume of the container at the respective graduations. A transverse elongated handle 7 is formed integral with the cup-shaped container 1 and extends outward from the mouth thereof. The handle is formed with a flat peripheral face 8 coplanar with the edge of the mouth portion 2. Between flat face portions 8 at the edges of the handle, the handle is hollowed out to reduce the material required for its production. Preferably the cup-shaped container 1, ribs 4 and handle 7 are molded to form an integral body.

Figure 7:
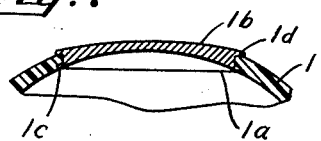
Figure 7 is a fragmentary section showing the end of one of the containers and the closure cap therefor.

As best seen in Fig. 7, the container 1 is formed with a circular aperture 1a at its narrow end which is closed by a metal cap 1b, whose periphery 1c at its inner face is turned over to snugly engage the inside of the plastic cup thereat while an external peripheral flange 1d on the cap snugly engages the outside of the plastic cup at the aperture 1a.

At its mouth 2, the cup-shaped container 1 is formed with an internal cut-away annular portion 9 extending around the interior of the mouth and terminating beyond the edge of the mouth in an annular, inwardly-extending shoulder 10. At its juncture with the handle, a rectangular recess 11 of the same depth is formed communicating with the recess formed at the cut-away mouth portion 9.

The opposite cup-shaped container 12 of the sifter is identical in shape, and is also graduated and formed of transparent or translucent plastic. It includes a relatively wide circular mouth 13 identical in size with the mouth 2 on the first container. An internal cut-away annular portion 14 extends around mouth 13 and terminates beyond the edge of the mouth in an inwardly-extending annular shoulder 15. A handle 16 is formed integral with the cup-shaped container 12 and extends transversely outward from the mouth thereof. The handle 16 is formed with a flat peripheral face 17 coplanar with the edge of mouth 13. A rectangular recess 18, formed at the juncture of the handle 16 with mouth 13, communicates with the cut-away mouth portion 14. A circular hole 19 is formed in container 12 at its narrow end remote from the mouth.

The closure cap 19a for the hole 19 is of annular formation, having a central opening 19b of smaller size than the cup hole 19. A pair of guide members 20, 21 formed on the closure cap 19a extend on either side of hole 19b and are formed with rectangular grooves 22, 23 adjacent the hole. A closure plate 24 is slidably supported in these grooves and normally is positioned to close the hole 19b. At its free end the slidable closure plate is formed with a semi-circular edge 25 adapted to register with a portion of the edge of hole 19b when the slidable closure plate is retracted away from its normal position blocking hole 19b.

Figure 6:
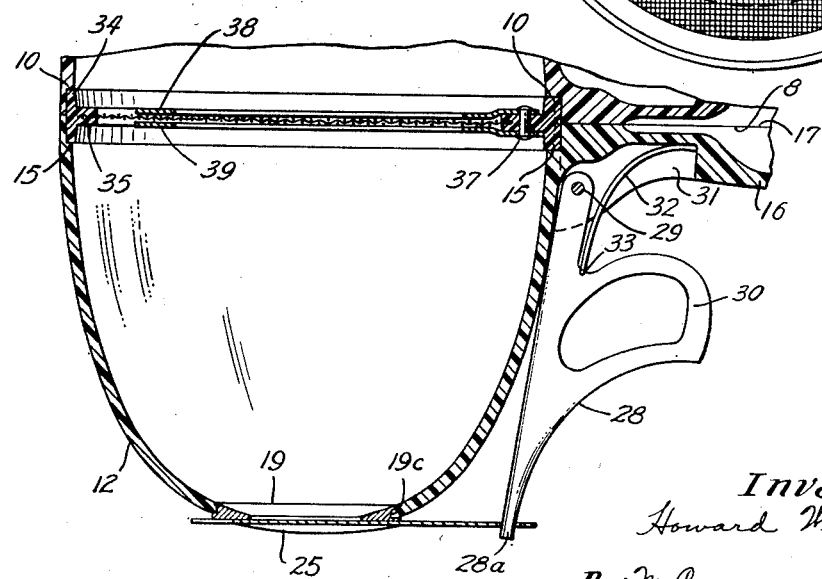
Figure 6 is a fragmentary longitudinal section of the assembled sifter.

As best seen in Figs. 6 and 8, the closure cap 19a includes an annular transverse shoulder 19c which abuts snugly against the cup opening 19 and is turned over at the periphery of its inner face. The inner face 19d of the closure cap is arcuate in shape to merge smoothly with the curved narrow end of the container 12 which terminates in hole 19. A transverse lug 19e projecting outward from cap shoulder 19c seats within a cooperating recess 19f formed at the container hole 19 to positively locate the closure cap 19a with its guides 20, 21 disposed on either side of the path of reciprocation of the slidable closure plate 24.

The slidable closure plate 24 is formed with a narrow extension 26 provided with an oval recess 27 adjacent its free end. A trigger 28 is pivotally mounted at 29 on handle 16 and carries a narrow free end 28a which extends loosely through opening 27 to pivotally interconnect the trigger with the closure plate. A finger loop 30 is formed on the trigger for receiving the user's index finger. Adjacent the trigger pivot pin 29 the handle 16 is recessed at 31 to receive one end of a leaf spring 32. (Similarly, a recess is also formed in the handle 7 of the container 1, since the respective container and handle constructions are identical, and therefore interchangeable.) At its other end the leaf spring is seated in a recess 33 formed in the trigger just above the finger loop 30. The leaf spring acts against the trigger to normally bias the latter to its extreme limit of movement clockwise in the drawings, so as to normally maintain the slidable closure plate 24 closing the hole 19b in end cap 19a.

The annular member which surrounds and supports the sifting screen includes a substantially cylindrical ring portion 34 and a transverse flat annular portion 35 integral with ring portion 34 at the inner side thereof surrounding the flat wire mesh screen 36. A pivot pin 37 extends perpendicularly through ring 35 and forms the pivotal axis for a pair of comparatively heavy metal agitators 38 and 39, which extend above and below screen 36. Each of these agitators is formed of two flat interconnected arcuate segments, whose curvature at their outer edges is substantially identical with that of the circumference of the screen, so that in either limit of movement an arcuate edge of each agitator abuts against the inner edge of annular portion 35 contiguous therewith. A rectangular protrusion 40 is formed on member 34 extending outward beyond the periphery thereof adjacent pivot pin 37.

When the sifter is assembled, the mesh screen 36 is carried between the cup-shaped containers 1 and 12 to separate them. The cylindrical ring 34 which supports the screen is snugly frictionally received in the annular recessed portions 9 and 14 at the abutting mouths of the containers 1 and 12 and is seated between the internal shoulders 10 and 15 formed on the respective containers. The protrusion 40 seats snugly within the recesses 11 and 18 to locate the agitator pivot pin 37 in alignment with the handles 7 and 16. The edges of the mouths on the respective containers abut against each other, and the flat handle edges 8 and 17 also abut to form a unitary handle which can be readily gripped by a single hand of the user. As is obvious, the assembled containers 1 and 12 form a closed receptacle, with the containers communicating with one another through the screen 36 at their open mouths.

In using the sifter, the container member 1 may be separated from the rest of the sifter and filled with the desired amount of flour, after which the sifter is assembled. The sifter is held by the handle 7, 16 and is rocked back and forth with an easy arm motion to cause the agitators 38, 39 to oscillate back and forth. When all of the flour has been sifted through the screen into the other container 12, the sifter is turned upside down and the sifting process repeated.

Normally, recipes call for the addition of baking soda, or certain other dry ingredients, to the flour after the flour has been sifted once. With the sifter of the present invention, such ingredients may be added to the once-sifted flour by operating trigger 28 to open hole 19 at the end of container 12. Of course the sifter would be inverted before this is done. This addition of further ingredients to be sifted with the flour and the further siftings of the flour take place without any danger of spilling or otherwise losing any of the flour and without any flour dust escaping from the sifter to annoy the operator.

After the first sifting, with the sifter inverted to position container 12 above screen 36, the sifter is again rocked back and forth to sift the flour back down into the graduated container 1.

After completion of the second sifting, the usual third sifting is preceded by the re-inverting of the sifter to again position container 1 above screen 36. Again the sifter is rocked back and forth to sift the flour back down into container 12. Since the latter is transparent or translucent and is graduated, the operator may at this time measure the volume of sifted flour. As is well understood in the cooking art, sifted flour due to its aeration occupies a greater volume than unsifted flour, and recipes usually call for flour in terms of its sifted volume so that for best cooking results the sifted flour should be measured, rather than to resort to guesswork by measuring out a smaller volume of unsifted flour. As is evident, the present invention permits the direct measurement of flour after it has been sifted without the necessity of removing the flour from the sifter for that purpose. Any excess flour may be emptied out through the end hole in container 12 by operating trigger 28.

The completely sifted and measured flour may then be emptied into the mixing bowl by manually operating the trigger 28 to retract the slidable closure plate 24. (It will be noted that all of these manipulations of the sifter, including the operation of trigger 28, are carried out by only one hand of the user.) Here again, when it comes to emptying out the completely sifted flour, the present invention is particularly advantageous in its construction and mode of operation. Many recipes call for the addition of flour in four parts in the mixing thereof with liquids, the liquid being added in three parts, so that the mixing of the sifted flour and the liquid is a gradual step-by-step process. This emptying out of portions only of the sifted flour at a time may be done quite easily with the sifter of the present invention because of the handy trigger arrangement which controls the discharge of flour from the sifter. Furthermore, only one hand is occupied with the sifter, leaving the other hand free to stir the ingredients in the mixing bowl.

At any time during the sifting operation outlined above, the user may wish to immediately attend to other matters in the kitchen or elsewhere around the house. The sifter can be put down at the completion of any of the siftings by resting the flat end faces on either set of longitudinal ribs on the table top. The sifter will be maintained in a stable position, with the handle 7, 16 extending horizontally, until the user again is free to pick it up and resume the sifting.

For cleaning the sifter after use, the parts may be disassembled readily by separating the handles 7 and 16, to thereby separate the cup-shaped containers 1 and 12 integral therewith. The unitary screen and agitator assembly 34—40 is also separated, and when disassembled from the containers may be cleaned easily.

While there has been described a particular embodiment of the present invention it is to be understood that modifications and variations from the specific illustrated form may be resorted to without departing from the spirit and scope of the invention.

I claim:

1. A sifter comprising a pair of separable, opposed, open-mouthed containers abutting at the edges of their open mouths and formed with annular cut-away portions extending around the inside of the open mouths to define inwardly-extending transverse shoulders spaced from the abutting edges of the open mouths, said containers being further formed with registering rectangular recesses cut away from said annular cut-away portions at the inside of the open mouths, a separable annular member snugly seated in said annular cut-away portions of the abutting mouths of the containers and formed with a rectangular peripheral protrusion snugly seated in said registering rectangular recesses thereat to positively locate the annular member angularly relative to the assembled containers, a screen carried by said annular member to extend thereacross and separate the assembled containers at the open mouths thereof, an agitator pivotally mounted on said annular member adjacent said rectangular protrusion thereon and extending across said screen, and handles extending outwardly from said containers at the rectangular recesses formed therein, said handles when the containers are assembled extending in the same direction and being formed with flat, opposed, abutting surfaces to form a unitary handle assembly.

2. A sifter comprising a pair of separable, opposed, open-mouthed containers abutting at their open mouths to form a closed receptacle, a screen extending across said assembled containers at the open mouths thereof, a movable agitator extending across said screen, handles extending outwardly from said containers at the open mouths thereof, said handles extending in the same direction and being formed with flat, opposed, abutting surfaces to form a unitary handle assembly when said containers are assembled in abutting relation, one of said containers being formed with a hole at one end spaced from its open mouth, a slidable closure member positioned to block said hole, and a trigger pivotally mounted on the handle of said one of said containers and interconnected with said closure member and operative to control the position thereof for selectively uncovering said hole, said trigger being formed with a finger-receiving portion adjacent said handle to receive the index finger of the user's hand holding said handle assembly.

3. A sifter comprising a pair of separable, opposed, open-mouthed containers abutting at their open mouths to form a closed receptacle, a separable screen held between said assembled containers at the open mouths thereof, a pivotally mounted agitator extending across said screen, handles extending outwardly from said containers at the open mouths thereof, said handles when the containers are assembled extending in the same direction and being formed with opposed, flat, abutting surfaces to form a unitary handle assembly, one of said containers being formed with a hole at one end spaced from its open mouth, a slidable closure member positioned to block said hole, and a trigger pivotally mounted on the handle of said one of said containers and interconnected with said closure member for controlling the position thereof relative to said hole, said trigger being formed with a finger-receiving portion adjacent the attached end of said handle for receiving the index finger of the user's hand gripping said handle assembly.

4. A sifter comprising a pair of separable opposed, open-mouthed containers abutting at their open mouths, at least one of said containers being formed of transparent or translucent material and being graduated to indicate the amount of sifting material contained therein, a separable screen extending across said abutting open mouths of the containers in the assembled position thereof, a movable agitator extending across said screen, handles attached to said containers at the open mouths thereof and extending outwardly therefrom, said handles when the containers are assembled extending in the same direction and being formed with flat, opposed, abutting surfaces to form a unitary handle assembly, one of said containers being formed with a hole at one end spaced from its open mouth, a movable closure member normally positioned to block said hole, and a trigger interconnected with said closure member and operative to control the position thereof for selectively uncovering said hole, said trigger being formed with a finger-receiving portion adjacent the attached end of the handle for receiving the index finger of the user's hand gripping said handle assembly.

References Cited in the file of this patent

UNITED STATES PATENTS

| Number | Name | Date |
|---|---|---|
| 490,902 | Galbreath | Jan. 31, 1893 |
| 586,106 | Ogden | July 13, 1897 |
| 789,517 | Williamson | May 9, 1905 |
| 909,649 | Newell | Jan. 12, 1909 |
| 1,091,517 | Knowles | Mar. 31, 1914 |
| 1,314,467 | Dachsel | Aug. 26, 1919 |
| 1,354,415 | Nepstad | Sept. 28, 1920 |
| 1,593,312 | Shappell | July 20, 1926 |
| 1,745,592 | White | Feb. 4, 1930 |
| 1,750,976 | Sturrock | Mar. 18, 1930 |
| 2,018,932 | Thorne | Oct. 27, 1935 |
| 2,642,992 | Winn | June 23, 1953 |